(12) United States Patent
Oh et al.

(10) Patent No.: US 8,346,004 B2
(45) Date of Patent: Jan. 1, 2013

(54) APPARATUS AND METHOD FOR REMOVING MOTION BLUR OF IMAGE

(75) Inventors: Hyun-hwa Oh, Yongin-si (KR);
Sung-Jea Ko, Yongin-si (KR);
Seung-won Jung, Yongin-si (KR);
Seong-deok Lee, Suwon-si (KR);
Ho-cheon Wey, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1198 days.

(21) Appl. No.: 11/980,377

(22) Filed: Oct. 31, 2007

(65) Prior Publication Data
US 2008/0253676 A1 Oct. 16, 2008

(30) Foreign Application Priority Data
Apr. 16, 2007 (KR) ........................ 10-2007-0037106

(51) Int. Cl.
*G06K 9/40* (2006.01)
*G02B 27/40* (2006.01)
*G02B 27/64* (2006.01)
*G02B 7/04* (2006.01)
*G03B 27/52* (2006.01)
*G03B 13/32* (2006.01)
*G03B 3/00* (2006.01)
*G03B 13/18* (2006.01)

(52) U.S. Cl. ..................... 382/255; 250/201.2; 348/345; 355/55; 396/89

(58) Field of Classification Search .................. None
See application file for complete search history.

(56) References Cited

U.S. PATENT DOCUMENTS

| 2003/0011717 A1* | 1/2003 | McConica | 348/699 |
| 2005/0074152 A1* | 4/2005 | Lewin et al. | 382/128 |
| 2005/0147313 A1* | 7/2005 | Gorinevsky | 382/255 |
| 2005/0231603 A1* | 10/2005 | Poon | 348/208.99 |
| 2006/0158523 A1* | 7/2006 | Estevez et al. | 348/208.4 |
| 2008/0137978 A1* | 6/2008 | Fu | 382/255 |

FOREIGN PATENT DOCUMENTS

| JP | 5-107619 | 4/1993 |
| JP | 11-134481 | 5/1999 |
| JP | 2005-100144 | 4/2005 |
| KR | 10-2001-0037829 | 5/2001 |

OTHER PUBLICATIONS

Biemond et al. "Iterative Method for Image Deblurring", Preoceedingds of the IEEE vol. 78 No. 5, May 1990.*

* cited by examiner

*Primary Examiner* — Randolph I Chu
(74) *Attorney, Agent, or Firm* — Staas & Halsey LLP

(57) ABSTRACT

An apparatus for removing motion blur of an image is disclosed. The apparatus includes a motion-blur-function-estimation unit that estimates the motion-blur function of an input image, an image-restoration unit that restores the input image using the estimated motion-blur function, a cost-calculation unit that calculates the blur cost of the restored image, and a control unit that determines the re-estimation of the motion-blur function depending on the calculated blur cost.

12 Claims, 15 Drawing Sheets

MOTION-BLUR FUNCTION OF INPUT IMAGE

INITIAL MOTION-BLUR FUNCTION

GAUSSIAN FUNCTION

EXPONENTIAL FUNCTION

LINEAR FUNCTION

ESTIMATED MOTION-BLUR FUNCTION

ACTUAL MOTION-BLUR FUNCTION OF INPUT IMAGE

INITIAL MOTION-BLUR FUNCTION

MOTION BLUR-FUNCTION ESTIMATED 5 TIMES

MOTION BLUR-FUNCITON ESTIMATED 10 TIMES

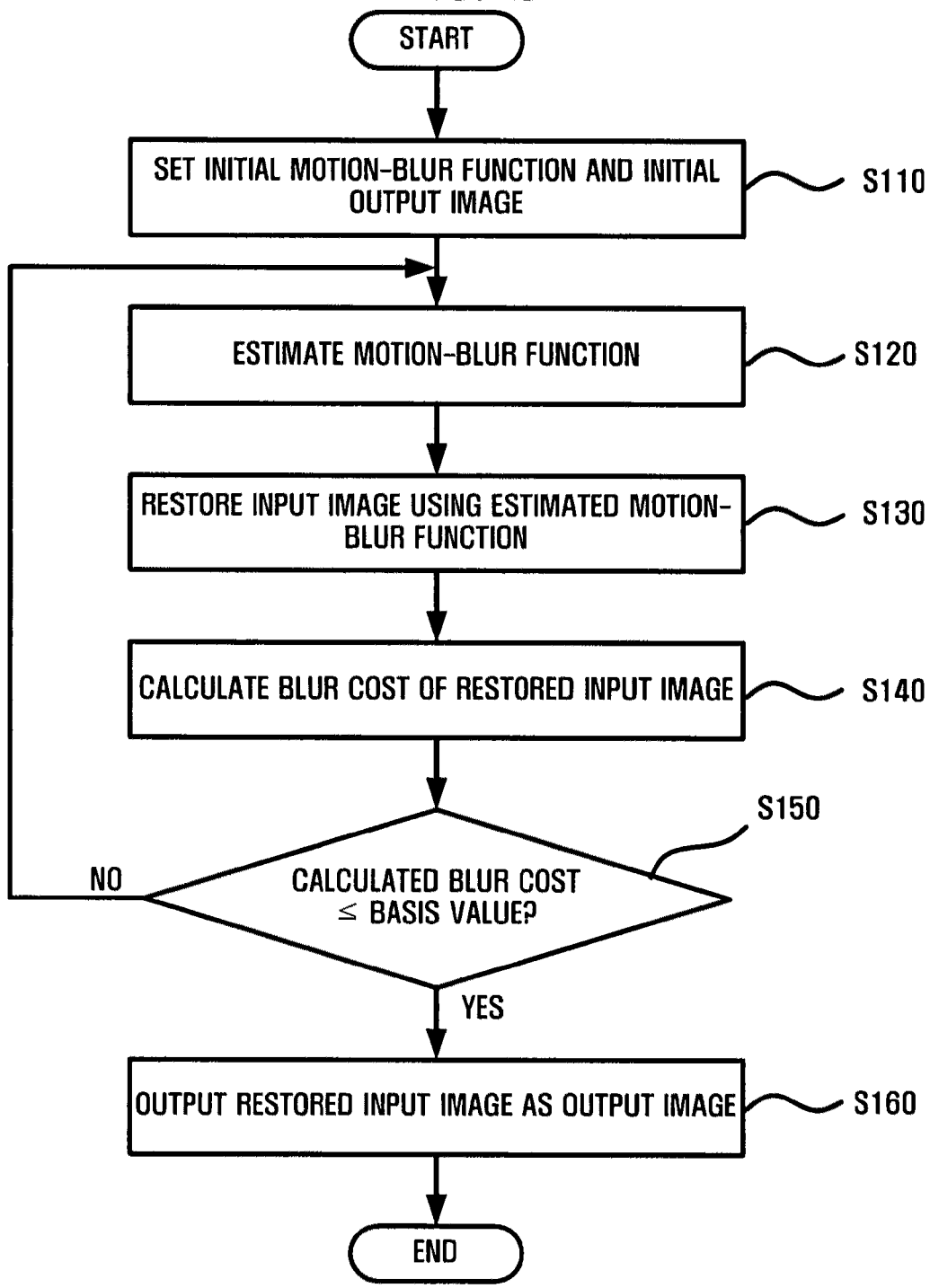

APPARATUS AND METHOD FOR REMOVING MOTION BLUR OF IMAGE

CROSS-REFERENCE TO RELATED APPLICATION

This application is based on and claims priority from Korean Patent Application No. 10-2007-0037106 filed on Apr. 16, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to a method and apparatus for removing motion blur in an image. More particularly, the present invention relates to an apparatus and method for removing motion blur in an image, which can estimate a motion-blur function corresponding to the motion, and remove the motion blur using the estimated motion-blur function.

2. Description of the Related Art

When a user obtains an image using a device with image-capturing hardware and software, such as a digital camera, the quality of the image is often deteriorated by motion blur generated shaking of the user's hand or the movement of the subject.

Technologies that can be used to prevent the shaking includes: an optical image stabilizer (OIS), an electrical image stabilizer (EIS), and a digital image stabilizer (DIS). The OIS, which is applied in most existing digital cameras, uses an active prism method, lens-shift method, or sensor-movement method.

Because this technology uses a gyro sensor for sensing the shaking, an optical system and a driving system, the structure of the body tube is complicated, and the size of the camera module is increased as a result.

Further, there are several ways to remove the motion blur generated in the obtained image, including a method based on the regular pattern of zeros in the frequency area, and other methods based on the stochastic linear model. These methods can be only applied to the linear motion blur (the case where the sizes and directions of the motion blurs are the same throughout the whole image). Hence, it cannot be estimated that the movement direction and the size of the subject is the same throughout the whole image when obtaining the image of a subject using a digital camera, and it is thus difficult to accurately estimate the motion blur function corresponding to the motion blur.

Korean Unexamined Patent 2001-0037829 discloses an image-processing system, which sets a multiple-channel-type addition function using time and space information, adaptively sets the adding value according to each pixel of a high-resolution image, reduces the calculation times by repetition, and adaptively selects normalization parameters according to pixels, in order to obtain the high-resolution image using the bilinear-interpolated image of a low-resolution image, but it is difficult to accurately estimate the motion-blur function corresponding to the motion blur when the movement direction and the size of the subject are not the same throughout the whole image, which is a problem.

SUMMARY OF THE INVENTION

An object of the present invention is to provide an apparatus and method for removing the motion blur of an image, which can estimate the motion-blur function for a non-linear motion blur using directional coefficients from an image where a motion blur has occurred, repeatedly performs the restoration process for the image using the estimated motion-blur function, and restores a clear image without any motion blur.

The present invention will not be limited to the technical objects described above. Other objects not described herein will be more definitely understood by those in the art from the following detailed description.

According to an exemplary embodiment of the present invention, there is provided an apparatus for removing the motion blur of an image, the apparatus including a motion-blur-function-estimation unit that estimates the motion-blur function of an input image, an image-restoration unit that restores the input image using the estimated motion-blur function, a cost-calculation unit that calculates the blur cost of the restored image, and a control unit that determines the re-estimation of the motion-blur function depending on the calculated blur cost.

According to an exemplary embodiment of the present invention, there is provided a method of removing the motion blur of an image, the method including estimating the motion-blur function of an input image, restoring the input image using the estimated motion-blur function, calculating the blur cost of the restored image, and determining the re-estimation of the motion-blur function depending on the calculated blur cost.

BRIEF DESCRIPTION OF THE DRAWINGS

The above and other features and advantages of the present invention will become apparent by describing in detail preferred embodiments thereof with reference to the attached drawings in which:

FIG. 15 is a flowchart illustrating a method of removing the motion blur of an image according to an exemplary embodiment of the present invention.

DETAILED DESCRIPTION OF THE INVENTION

Figure 1:
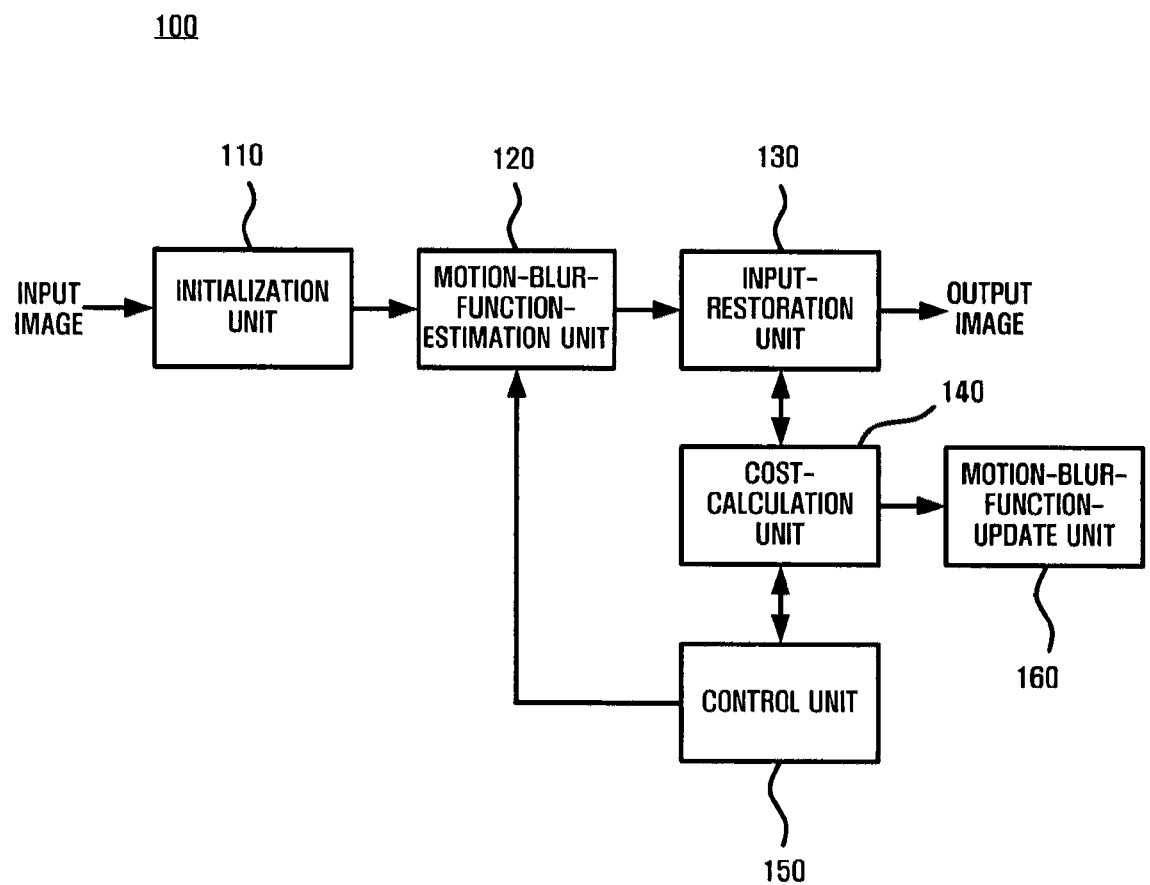
FIG. 1 is a block diagram illustrating an apparatus for removing the motion blur of an image according to an exemplary embodiment of the present invention.

Exemplary embodiments of the present invention will be described in detail with reference to the accompanying drawings.

The present invention may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention is described hereinafter with reference to flowchart illustrations of user interfaces, methods, and computer program products according to embodiments of the invention. It should be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded into a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in reverse order, depending upon the functionality involved.

FIG. 1 is a block diagram illustrating an apparatus for removing the motion blur of an image according to an exemplary embodiment of the present invention.

As illustrated, an apparatus 100 for removing the motion blur of an image includes an initialization unit 110, a motion-blur-function-estimation unit 120, an image-restoration unit 130, a cost-calculation unit 140, a control unit 150, and a motion-blur-function-update unit 160.

The initialization unit 110 can set the initial motion-blur function and initial output image for an input image. That is, in the case where an image having motion blur is inputted, because the motion-blur function for the input image has not been estimated, the initialization unit can set the initial motion-blur function by setting the initial motion-blur function using an arbitrary motion vector, and the initial output image can be set as an input image. Hereinafter, the motion blur function is called "h", the input image is called "g", and the output image is called "f".

Figure 2:
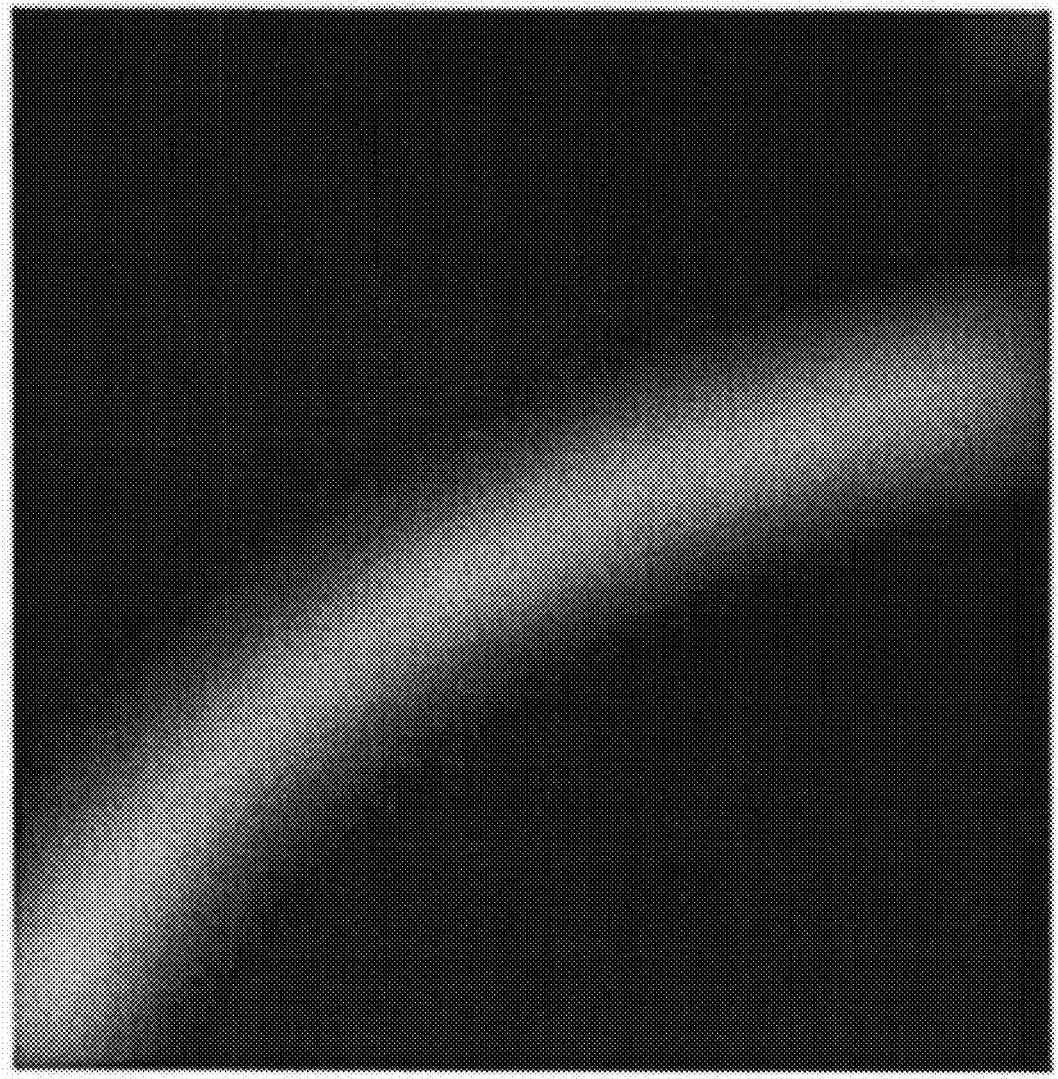
FIG. 2 illustrates a real motion-blur function of an input image according to an exemplary embodiment of the present invention.
Figure 3:
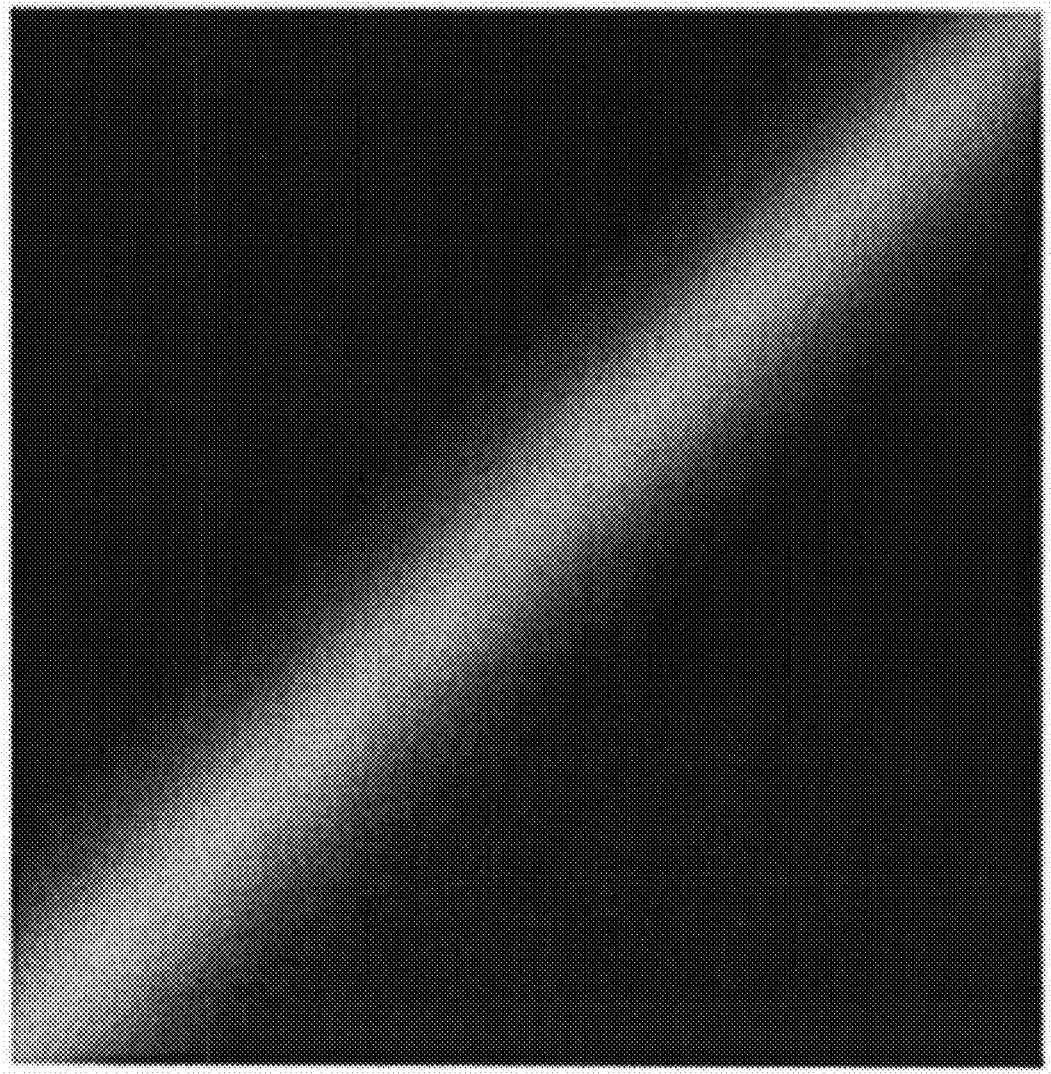
FIG. 3 illustrates an initial motion-blur function according to an exemplary embodiment of the present invention.

FIGS. 2 and 3 illustrate the motion-blur function and the initial motion-blur function of an input image according to an exemplary embodiment of the present invention.

As illustrated, in the case where the input image has the motion-blur function as in FIG. 2, the initialization unit 110 can arbitrarily set the initial motion-blur function as in FIG. 3, and the motion-blur-function-estimation unit 120 can estimate the motion-blur function of an input image based on the initial motion-blur function of FIG. 3.

The motion-blur-function-estimation unit 120 can estimate a motion-blur function by applying the coefficient having multiple directions to the initial motion-blur function set in the initialization unit 110. Here, the motion-blur function estimated at the motion-blur-function-estimation unit 120 needs to satisfy conditions for non-negativity and energy preservation as in the following equation 1.

$$h(m_1, m_2) \geq 0, \qquad (1)$$
$$\sum_{(m_1, m_2) \in S_h} h(m_1, m_2) = 1$$

Here, $S_h$ represents the motion-blur-function area, and $m_1$ and $m_2$ represent the index of the motion-blur-function area. In the case where the index of the input image consists of x and y, the motion-blur-function area is smaller than the area of the input image, and thus the index of $m_1$ and $m_2$ is used for distinction.

The motion-blur-function-estimation unit 120 can estimate the motion-blur function by applying the coefficient having multiple directions to the initial motion-blur function. Here, the motion-blur-function-estimation unit 120 applies the coefficient, for example, in four directions of up and down, and right and left.

The motion-blur-function-estimation unit 130 can convolute the coefficient in a predetermined direction on a predetermined pixel of the initial motion-blur function, and estimate the motion-blur function. Here, the motion-blur-function-estimation unit 130 applies the coefficient to each direction in order, compares the result with the motion-blur function of the input image, and considers the coefficient of the most similar direction as valid in order to estimate the motion-blur function, and considers the coefficients of non-similar directions as invalid.

Figure 4:
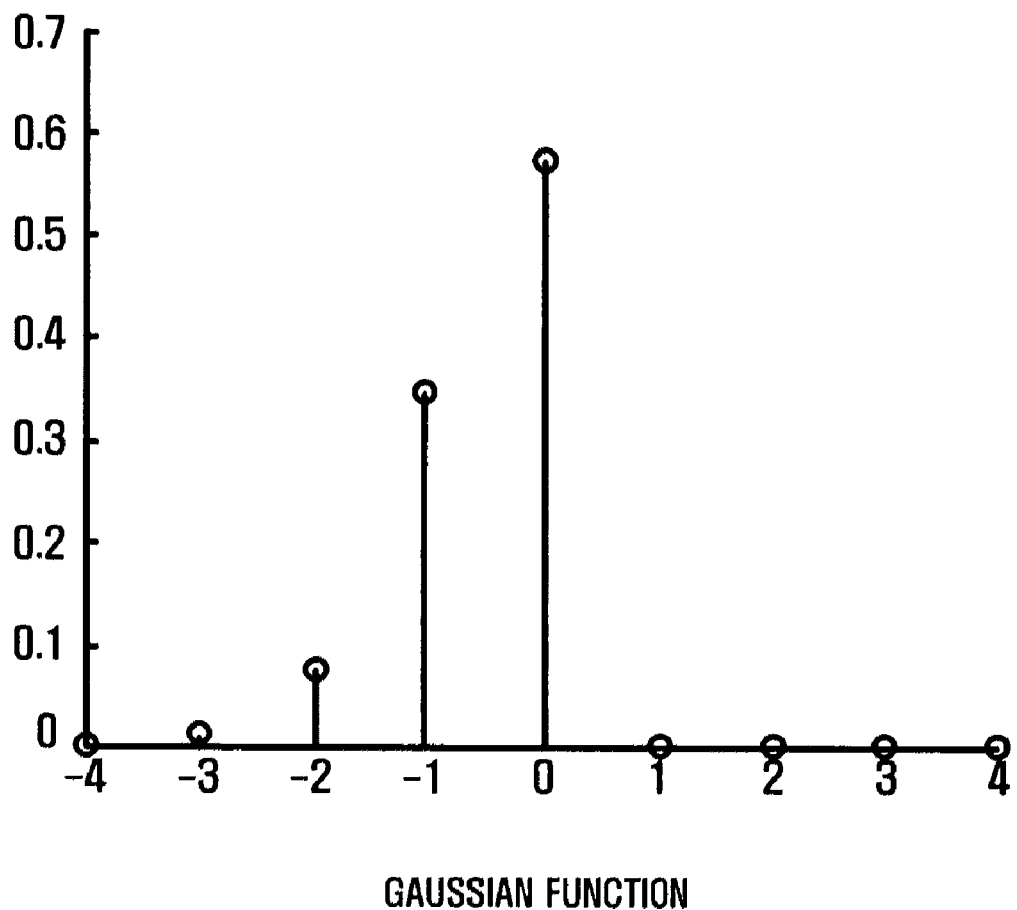
FIGS. 4 to 6 are graphs illustrating filter features to apply coefficients according to an exemplary embodiment of the present invention.
Figure 5:
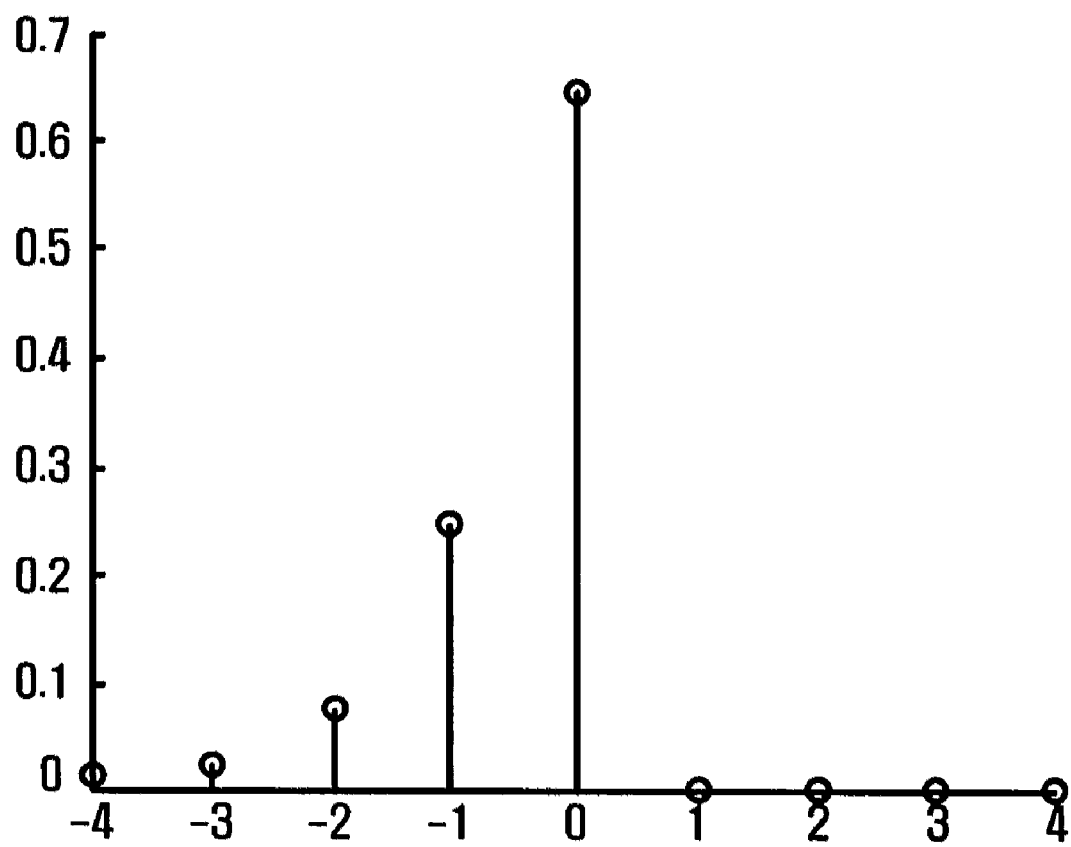
Figure 6:
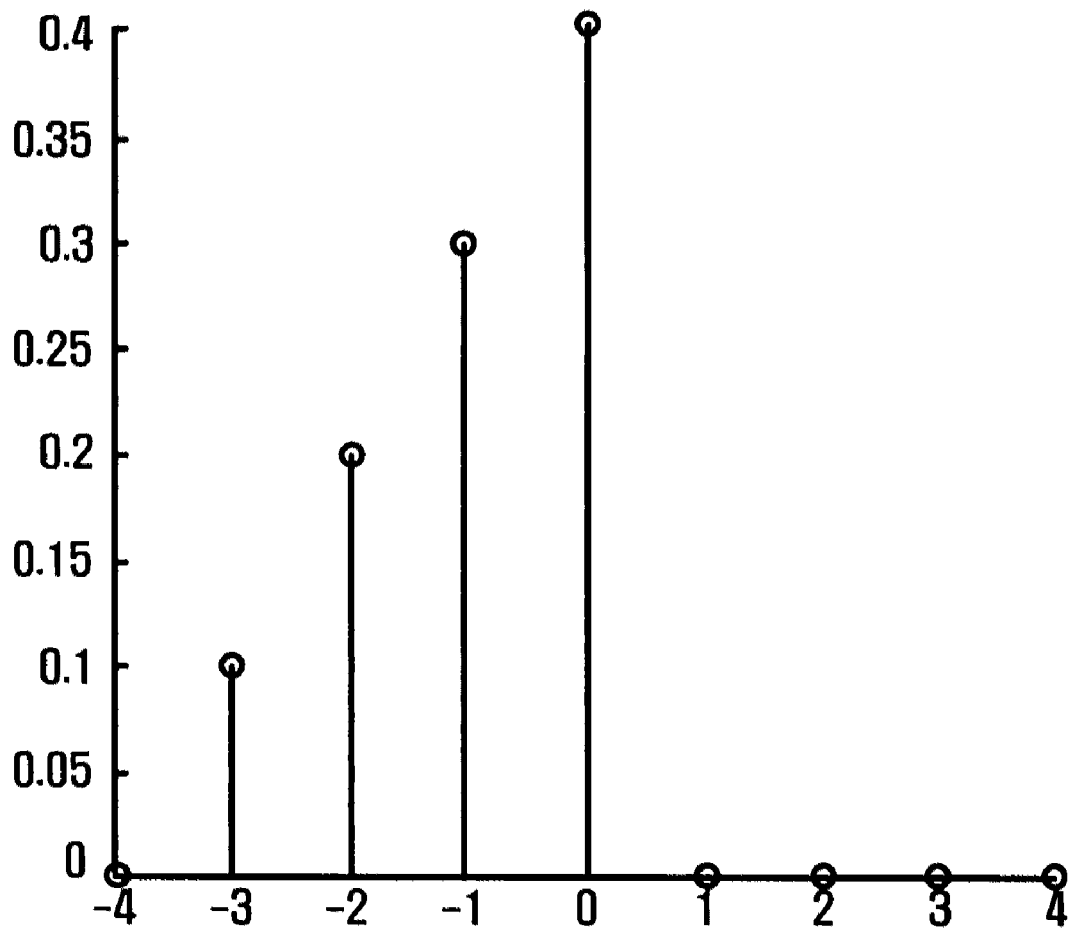

FIGS. 4 to 6 are graphs illustrating filter features to apply coefficients according to an exemplary embodiment of the present invention. Further, FIGS. 4 to 6 can be understood as filter features for the motion-blur-function-estimation unit 120 to apply the coefficient to the left direction.

As illustrated, if it is estimated that the location of the basis pixel is 0, as the location of the pixel moves to the left by −1, −2, and −3, the motion-blur-function-estimation unit 120 applies smaller coefficients in order to prevent the spread in the function-estimating process. Further, in FIGS. 4 to 6, the sum of coefficients applied to each pixel in the specified direction becomes 1 in order to satisfy the aforementioned energy-preservation conditions. That is, in the case where the coefficients are applied to the left direction, the coefficients can be expressed as $a_0, a_1, \ldots, a_c, 0\ 0\ \ldots\ 0$. Here, $a_i$ is the $i^{th}$ coefficient, and $a_c$ is the coefficient applied to the basis pixel, where $a_{i-1} \leq a_i$. That is, $a_0 < a_1 < \ldots < a_c$.

Further, FIGS. 4 to 6 show that the coefficients can be expressed as various functions such as Gaussian function, exponential function, and linear function.

Figure 7:
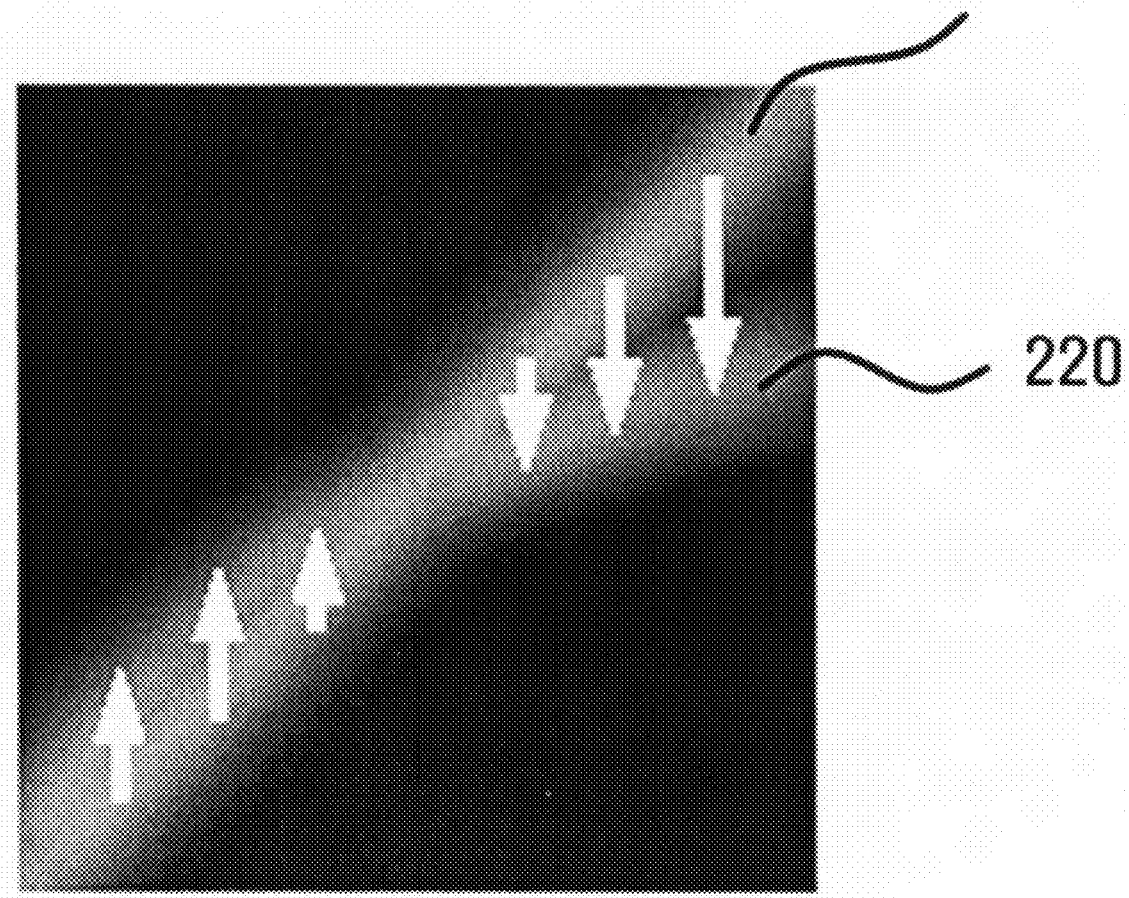
FIG. 7 illustrates a motion-blur function estimated according to an exemplary embodiment of the present invention.

In the case of the motion-blur function 220 modified by the motion-blur-function-estimation unit 120, the initial motion-blur function 210 of FIG. 3 can be estimated in the direction of the arrow of FIG. 7.

Further, the motion-blur function can be ideally estimated per pixel. However, the motion-blur function of the background and that of the subject are usually almost the same. Hence, the linear shift variant (LSV) motion-blur function can be effectively estimated by the motion-blur function after analyzing the motion of the image.

The image-restoration unit 130 can restore the input image using the motion-blur function estimated by the motion-blur-function-estimation unit 120. Here, in the present embodiment, the motion-blur function estimated by the motion-blur-function-estimation unit is called $h_i$, and the input image restored by the estimated motion-blur function is called $f_i$. Here, in $h_i$ and $f_i$, i is the number of re-estimations of the motion-blur function. For example, the motion-blur function estimated as the fifth time is $h_5$, and the input image restored by the fifth reestimated motion-blur function is $f_5$.

The cost-calculation unit 140 can calculate the blur cost of the input image restored by the image-restoration unit 130. Here, the blur cost is defined using the blurred level and artifact level of the restored input image as parameters in order to determine the accuracy of the motion-blur function estimated by the motion-blur-function-estimation unit 120, and can be expressed by the following equation 2.

$$C(f_i) = M_B(f_i) + \lambda M_A(f_i) \quad (2)$$

In equation 2, $C(f_i)$ represents the blur cost, $M_B(f_i)$ represents the blurred level of the input image restored by the $i^{th}$ estimated motion-blur function, $M_A(f_i)$ represents the artifact level of the input image restored by the $i^{th}$ estimated motion-blur function, and $\lambda$ represents the weight to $M_B(f_i)$ and $M_A(f_i)$.

Figure 8:
FIG. 8 illustrates an input image according to an exemplary embodiment of the present invention.
Figure 9:
FIG. 9 illustrates the edge of an input image according to an exemplary embodiment of the present invention.
Figure 10:
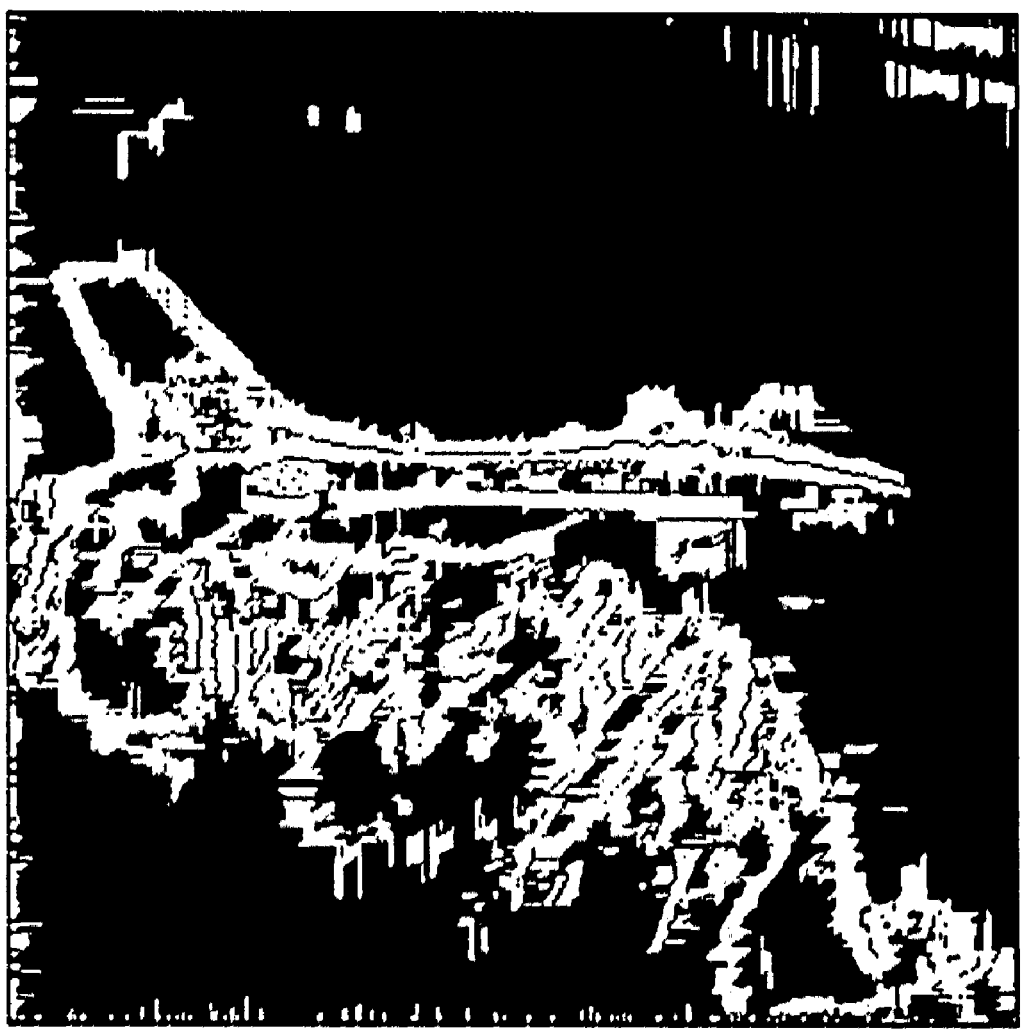
FIG. 10 illustrates the edge width mask of an input image according to an exemplary embodiment of the present invention.
Figure 11:
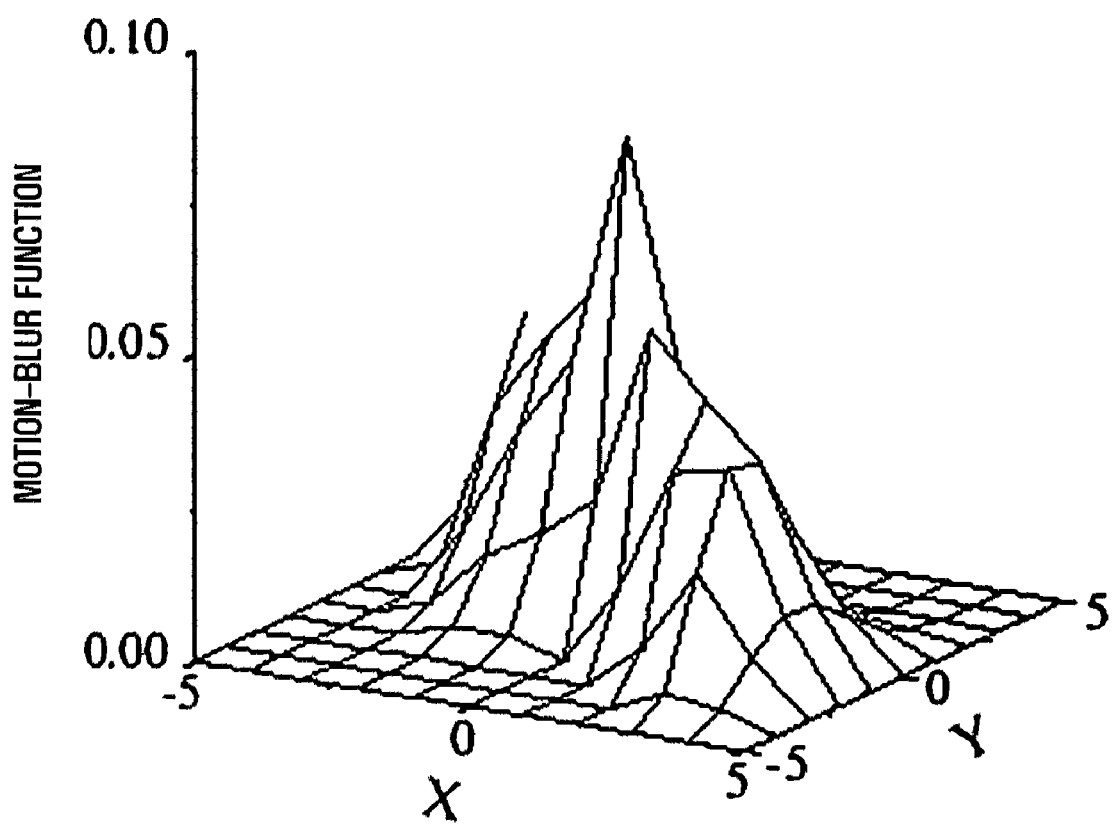
FIG. 11 is a graph illustrating a real motion-blur function of an input image according to an exemplary embodiment of the present invention.
Figure 12:
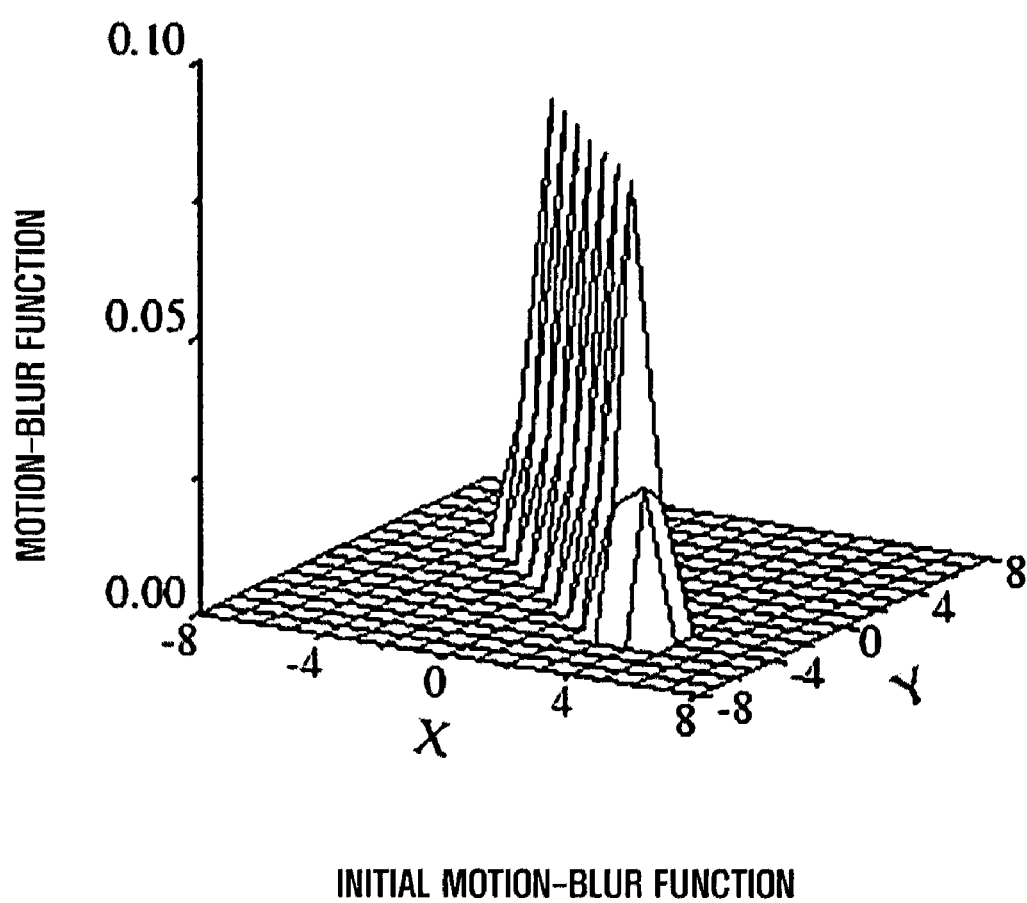
FIG. 12 is a graph illustrating an initial motion-blur function according to an exemplary embodiment of the present invention.

Here, the cost-calculation unit 140 detects the edge from the input image where the motion blur is generated as in FIG. 8, and calculates $M_B(f_i)$ by calculating the edge width of the detected edge as in FIG. 10. For example, the cost-calculation unit 140 can calculate the edge width by calculating the distance between two points by detecting pixels having the minimum and maximum values in upward and downward directions or in right and left directions based on a predetermined edge point from the detected edge.

As the motion-blur function estimated by the motion-blur-function-estimation unit 120 approaches the actual motion-blur function of the input image, the blurred level of the surrounding area of the edge decreases. Hence, whenever the input image is restored by the image-restoration unit 130, the cost-calculation unit 140 calculates the blurred level of the restored input image.

Further, as the motion-blur function estimated by the motion-blur-function-estimation unit 120 approaches the actual motion-blur function of the input image, the artifact of the restored input image is generated less, and thus the cost-calculation unit 140 uses an edge-width mask whenever the input image is restored. The edge-width mask is represented by the following equation 3.

$$B_{EW} = \begin{cases} 1 & \text{if } (m_1, m_2) \in E_{SP} \\ 0 & \text{otherwise} \end{cases} \quad (3)$$

In equation 3, $E_{sp}$ represents the edge and the edge-width area. Generally, the motion-blur function shows a low-pass characteristic, and thus a change by the motion blur is mainly shown. Hence, the change in an area except the edge-width mask can be considered as an artifact generated in the process of restoring the image, and thus $M_A(f_i)$ can be obtained by equation 4:

$$M_A(f_i) = \sum_{(m_1, m_2) \in S_h} B_{EW}^C(m_1, m_2) \cdot |f_i(m_1, m_2) - g(m_1, m_2)| \quad (4)$$

In equation 4, $B_{ew}$ represents the edge-width mask of the image, c represents the bit-wise complement operation, $f_i(m_1, m_2)$ represents the restored image, and $g(m_1, m_2)$ represents the input-blur image.

In the case where the blur cost obtained by the above-mentioned equations 2 to 4 converges to a predetermined basis value, the control unit 150 terminates the restoration process of the input image, but otherwise allows the motion-blur-function-estimation unit 120 to re-estimate the motion-blur function. That is, the estimation of the motion-blur function and the restoration process of the input image are repeated until the blur cost converges to the predetermined basis value. That is, as the motion-blur-function-estimation unit 120 repeatedly estimates the motion-blur function, the initial motion-blur function of FIG. 3 approaches the motion-blur function of the input image of FIG. 2.

The motion-blur-function-update unit 160 updates the motion-blur function estimated in advance by the motion-blur-function-estimation unit 120 as in equation 5.

$$h_{i+1} = \begin{cases} h_i & \text{if } C(f_i) \leq C(f_{i-1}) \\ h_{i-1} & \text{otherwise} \end{cases} \quad (5)$$

$$f_{i+1} = \begin{cases} f_i & \text{if } C(f_i) \leq C(f_{i-1}) \\ f_{i-1} & \text{otherwise} \end{cases}$$

In equation 5, the motion-blur function and the restored input image can be updated in the case where the blur cost of the input image restored by the estimated motion-blur function is less than the blur cost of the input image restored by the blur function, but otherwise they are not updated.

Figure 13:
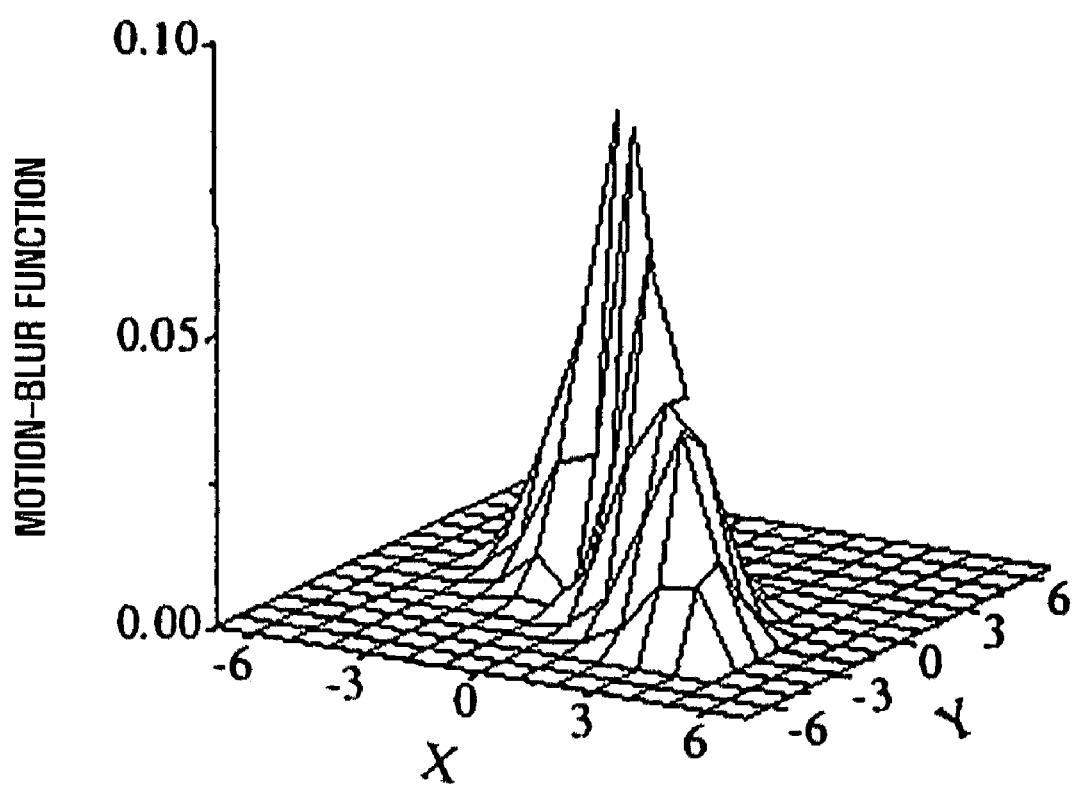
FIG. 13 illustrates a motion-blur function estimated five times according to an exemplary embodiment of the present invention.
Figure 14:
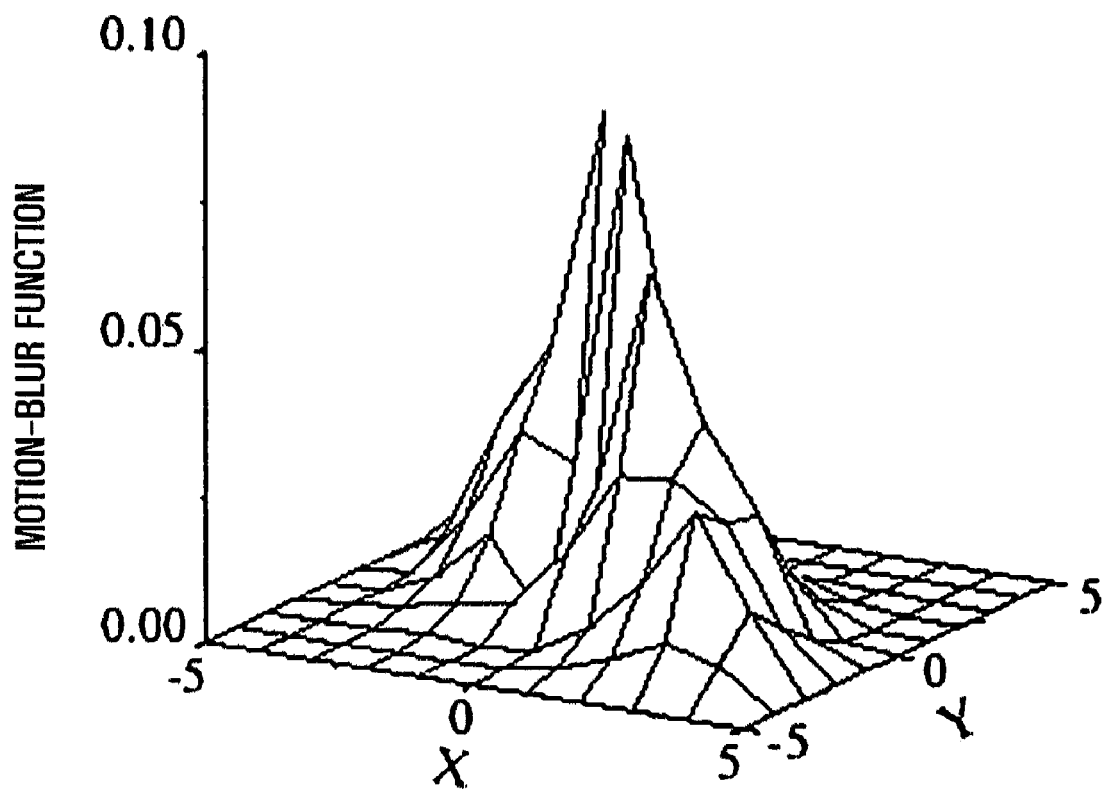
FIG. 14 illustrates a motion-blur function estimated ten times according to an exemplary embodiment of the present invention.

Likewise, in the case where the motion-blur function is repeatedly estimated by the control unit 150, as the number of re-estimations of the motion-blur function increases, the function approaches the actual motion-blur function. Here, FIG. 13 illustrates the case of 5 estimations, and FIG. 14 illustrates the case of 10 estimations.

FIG. 15 is a flowchart illustrating a method of removing the motion blur of an image according to an exemplary embodiment of the present invention.

As illustrated, in order to remove the motion blur of the image according to an exemplary embodiment of the present invention, first, the initialization unit 110 sets the initial motion-blur function of the input image, and the initial output image S110. Here, the initial motion-blur function can be set by an arbitrary motion vector, or by estimating the global motion vector of the input image, but the present invention is not limited to them.

The motion-blur-function-estimation unit 120 estimates the motion-blur function by applying coefficients having diverse directions to the initial motion-blur function set in the initialization unit 110 S120. Here, the motion-blur function estimated by the motion-blur-function-estimation unit 120 satisfies non-negativity and energy preservation conditions for repetitive re-estimations, the coefficients applied in the predetermined direction are non-negative, and the sum of the coefficients is 1.

The image-restoration unit 130 restores the input image using the motion-blur function estimated by the motion-blur-function-estimation unit 120 S130.

The cost-calculation unit 140 calculates the blur cost using the blur level and the artifact level of the input image restored by the image-restoration unit 130 S140. Here, the blur cost can be calculated using equation 2, the blur level can be calculated using the edge width of the detected edge, and the artifact level can be calculated using the edge-width mask.

The control unit 150 compares the blur cost calculated by the cost-calculation unit 140, and a predetermined basis value, and determines whether the motion-blur function needs to be re-estimated according to the result of the comparison.

Specifically, the control unit 150 compares the calculated blur cost and the predetermined basis value S150, and if the blur cost is less than the basis value, the control unit 150 determines that the estimated motion-blur function has approached the actual motion-blur function of the input image, and determines the restored input image as the output image S160. However, if the blur cost is larger than the predetermined basis value, the control unit 150 determines that the estimated motion-blur function has not approached the actual motion-blur function of the input image, and controls the motion-blur-function-estimation unit 120 to re-estimate the motion-blur function.

Further, the motion-blur-function-update unit 160 updates the estimated motion-blur function and the restored input image using equation 5. Further, the motion-blur-function-update unit 160 includes a separate element to store the updated motion-blur function and the updated restored image, or an external storage medium, but the present invention is not limited to them.

In the facial-image-compensating device and method according to the embodiment of the present invention, the term "unit" used in this embodiment refers to a hardware element such as a Field Programmable Gate Array (FPGA) or an Application Specific Integrated Circuit (ASIC), and "unit" executes certain roles. "Unit" can be constituted to exist in addressable storage media, or can be constituted to regenerate one or more processors. For example, "unit" can include software elements, object-oriented software elements, class elements, task elements, processes, functions, attributes, procedures, circuits, data, database, data structures, tables, arrays, and variables. Elements and functions provided in "units" can be combined into fewer elements or "units", or can be divided into additional elements and "units".

It should be understood by those of ordinary skill in the art that various replacements, modifications and changes may be made in the form and details without departing from the spirit and scope of the present invention as defined by the following claims. Therefore, it is to be appreciated that the above described embodiments are for purposes of illustration only and are not to be construed as limitations of the invention.

The method and apparatus of the present invention has the following advantages.

First, since the motion blur is removed based on the image information, no optical system is necessary to prevent device shaking, and thus the structure of the image-capturing device is simpler, and its cost is reduced.

Second, motion blur can be removed from an image through a motion-blur-function estimation.

What is claimed is:

1. An apparatus removing motion blurs of an image, the apparatus comprising:
    at least one processing device to execute:
    a motion-blur-function-estimation unit that estimates the motion-blur function for non-linear motion of an input image;
    an image-restoration unit that restores the input image using the estimated motion-blur function;
    a cost-calculation unit that calculates the blur cost of the restored image; and
    a control unit that determines the re-estimation of the motion-blur function depending on the calculated blur cost,
    wherein the motion-blur-function-estimation unit estimates the motion-blur function by applying predetermined coefficients to an initial motion-blur function of the input image for multiple directions, compares the result with the motion-blur function of the input image, considers the coefficient of the most similar direction as valid in order to estimate the motion-blur function, and considers the coefficients of non-similar directions as invalid.

2. The apparatus of claim 1, wherein the coefficients are defined for four directions, and decrease in the set direction from the basis pixel.

3. The apparatus of claim 2, wherein a sum of the coefficients is 1.

4. The apparatus of claim 1, wherein the cost-calculation unit calculates the blur cost using the blur level and artifact level of the restored image as parameters.

5. The apparatus of claim 1, wherein the control unit controls the motion-blur-function-estimation unit until the calculated blur cost converges to a predetermined basis value, by which the motion-blur function is repeatedly estimated.

6. The apparatus of claim 1, further comprising:
    a motion-blur-function-update unit that updates the input image restored by the estimated motion-blur function and the estimated motion-blur function.

7. A method of removing motion blur of an image, the method comprising:
    estimating the motion-blur function for non-linear motion of an input image;
    restoring the input image using the estimated motion-blur function;
    calculating the blur cost of the restored image; and
    determining the re-estimation of the motion-blur function depending on the calculated blur cost,
    wherein the estimating the motion-blur function applies predetermined coefficients to an initial motion-blur function of the input image for multiple directions, compares the result with the motion-blur function of the input image, considers the coefficient of the most similar direction as valid in order to estimate the motion-blur function, and considers the coefficients of non-similar directions as invalid.

8. The method of claim 7, wherein the coefficients are defined for four directions, and decrease in the set direction from the basis pixel.

9. The method of claim 8, wherein the sum of the coefficients is 1.

10. The method of claim 7, wherein the calculating includes calculating the blur cost using the blur level and artifact level of the restored image as parameters.

11. The method of claim 7, wherein the determining includes controlling the process until the calculated blur cost converges to a predetermined basis value, by which the motion-blur function is repeatedly estimated.

12. The method of claim 7, further comprising:
updating the input image restored by the estimated motion-blur function and the estimated motion-blur function.

* * * * *

UNITED STATES PATENT AND TRADEMARK OFFICE
CERTIFICATE OF CORRECTION

PATENT NO. : 8,346,004 B2
APPLICATION NO. : 11/980377
DATED : January 1, 2013
INVENTOR(S) : Hyun-hwa Oh et al.

It is certified that error appears in the above-identified patent and that said Letters Patent is hereby corrected as shown below:

Title Page, Column 2 (Other Publications); Line 2; Delete "Preoceedingds" and insert -- Proceedings --, therefor.

Signed and Sealed this
Fourteenth Day of May, 2013

Teresa Stanek Rea
*Acting Director of the United States Patent and Trademark Office*